Figure 1:
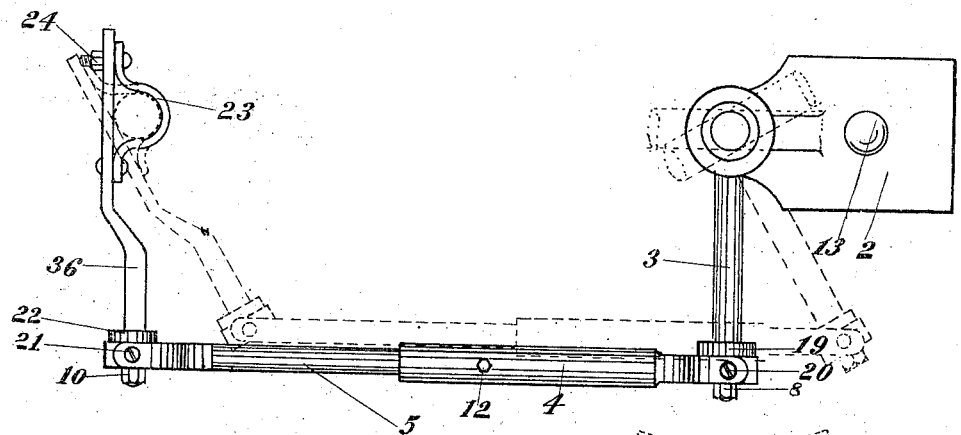

W. B. HARGREAVES.
CONTROLLABLE HEADLIGHT FOR VEHICLES.
APPLICATION FILED OCT. 24, 1911.

1,037,000.

Patented Aug. 27, 1912.

3 SHEETS—SHEET 1.

Witnesses:
Richard E. Kromauer
Emil Miller

Wilson B. Hargreaves
Inventor
By his Attorney John F. Kerr

W. B. HARGREAVES.
CONTROLLABLE HEADLIGHT FOR VEHICLES.
APPLICATION FILED OCT. 24, 1911.

1,037,000.

Patented Aug. 27, 1912.

3 SHEETS—SHEET 2.

Witnesses:
Richard Kronauer
Emil Miller

Wilson B. Hargreaves
Inventor
By his Attorney John F. Kerr

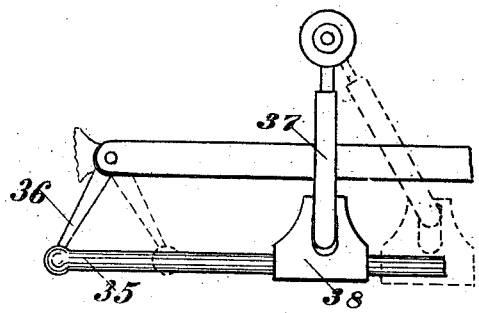
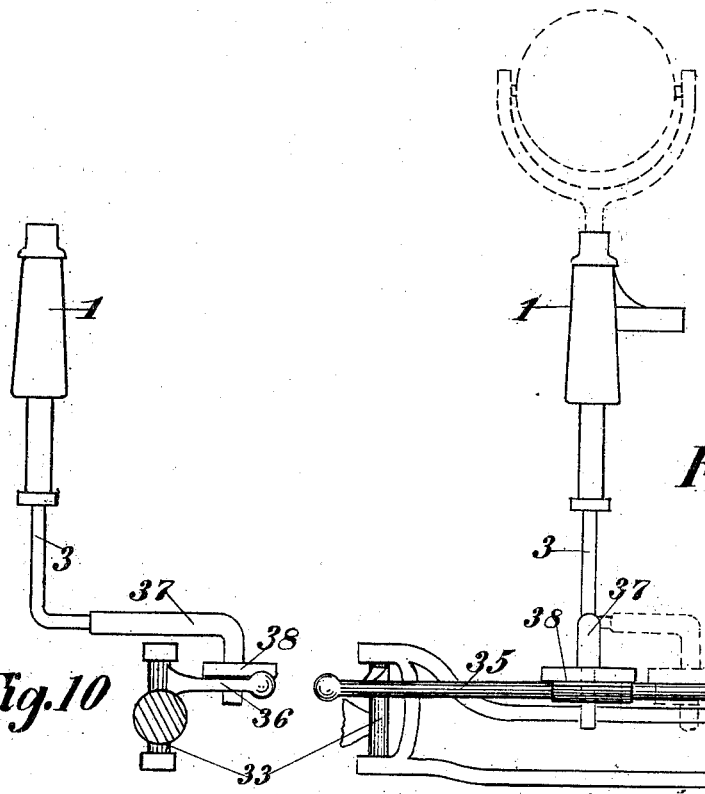

UNITED STATES PATENT OFFICE.

WILSON B. HARGREAVES, OF BLOOMINGDALE, NEW JERSEY.

CONTROLLABLE HEADLIGHT FOR VEHICLES.

1,037,000.  Specification of Letters Patent.  Patented Aug. 27, 1912.

Application filed October 24, 1911. Serial No. 656,540.

*To all whom it may concern:*

Be it known that I, WILSON B. HARGREAVES, a citizen of the United States of America, residing at Bloomingdale, in the county of Passaic and State of New Jersey, have invented certain new and useful Improvements in Controllable Headlights for Vehicles, of which the following is a specification, reference being had therein to the accompanying drawing.

My invention relates to lighting devices for vehicles, to light up the road at night, in order that the driver, engineer or chauffeur may see whether the road is free and clear of obstacles or the reverse and to prevent accidents and collisions.

There are methods of lighting and illuminating vehicles now in vogue in which dirigible supports for lamps are employed and other controlling means for headlights; but the turn of the lamp is limited by the controlling means.

The object of my invention is to provide a lamp or lamps, or other illuminating devices, which not only turn in unison with the front or steering wheels of the vehicle on which are operated in conjunction, and in combination, with the steering mechanism; but to provide a lamp which may be turned completely around or made to face in any direction and which may be made to tip at an angle, as shown in the accompanying drawings, for the purpose of making repairs or backing up.

It is obvious that the adoption of my safety lighting device will make the roads, at curves or crossings, where streets intersect, safer for both pedestrians and passengers in vehicles, as in turning corners or curves the lights or lamps turn with the pivotal part of the running gear or steering wheels in advance of the body and light up the path to be traversed, and that the lamp may be reversed to light up the road when going backward, or when making repairs.

A further object is to provide a device of this character which can be readily attached to or detached from the operating mechanism of the steering apparatus or to a portion of the wagon that is pivoted to swerve as required, to either side of the line of draft, when turning a curve or corner. In the day-time the lamps being detached from the steering mechanism much wear and tear is thus avoided.

A still further object is to provide a device of this character, which can allow for inequalities in, or unevenness of the road; that may be readily mounted on or removed from the vehicle and which will be simple in construction, economical, durable, compact and capable of operating with facility, without interfering with the construction or operation of any vehicle.

The accompanying drawings form a part of this specification and represent what I consider the best means for putting my invention into practice.

In the several views, like reference numerals indicate like parts.

Figures 3, 4:
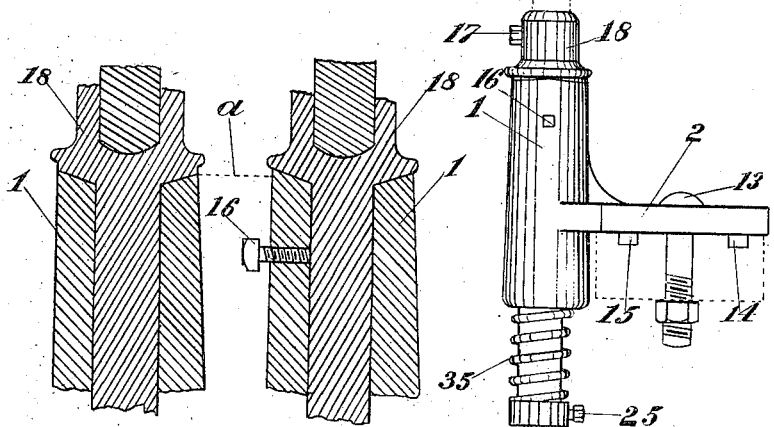
Figure 2:
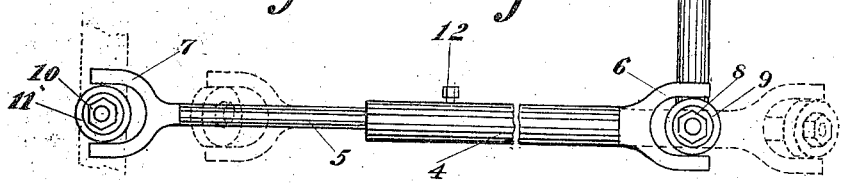
Figure 5:
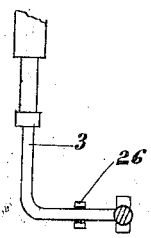
Figure 6:
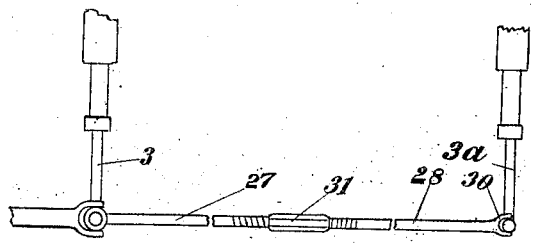
Figure 7:
Figure 8:
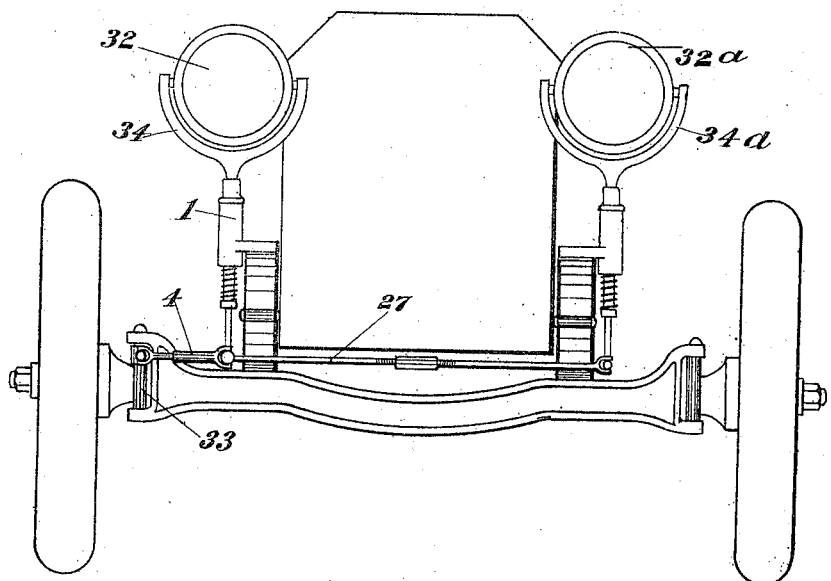

Figure 1, is a plan view and Fig. 2 an elevation of my device, showing the operation of the same; Figs. 3 and 4 are two vertical sections of the lamp-support, said sections being perpendicular to each other, showing the rise of the spindle in the head; and Figs. 5, 6 and 7 are respectively end and front elevations and plan view showing the pivotal connections of the connecting rod and arms; Fig. 8 is a front view of my device attached to an automobile; in connection with the steering axle, and Figs. 9, 10 and 11 are respectively plan view and side and front elevations showing my device employed in connection with the tie-bar, which connects the steering arms of automobile axles.

The lamps 32 and 32ª may be mounted in brackets 34 and 34ª and the lower ends of said brackets be secured against movement by the bolt 17 in the receptacles, which are adapted to receive the lower ends of said brackets in the spindles 18. Spindle 18 passes through the bearing-head 1, which is secured to the automobile frame, as shown in dotted lines in Fig. 4, by means of the lugs 14 and 15 and the bolt 13. The spindle 18 is provided at its upper end with a cylindrical pocket shown in section in Figs. 3 and 4. The bracket in which the lamp is pivotally hung fits into the upper cylindrical pocket in the spindle 18 and may be turned around in any direction and held against movement by the thumb screw 17.

The lower end of the spindle 18 receives the end of the vertical portion of the bent arm 3 and is secured thereto by the screw 25, and held in position therein by the screw 25 is the bent arm 3. Motion is imparted to said bent arms 3 by means of an adjustable rod, consisting of the two parts 4 and 5, the latter sliding within the former and being held in place by the screw 12. The arm 36 is fastened to the steering axle 33, as indicated in Fig. 8, and as shown by the dotted circle in Fig. 1 by means of the straps 23 and bolt 24. At each end of the arms or rods 4 and 5, is a fork or bifurcated end 6 and 7. The rings 9 and 11 are pivotally fastened to the said forks 6 and 7 by means of the pivots 20 and 21 as shown in Fig. 1. The arms 3 and 36 pass through said rings 9 and 11 respectively, which are held in place on said arms by the collars 19 and 22 and the nuts 8 and 10.

When the steering axle 33 turns, it twists the device to the position shown by the dotted lines in Figs. 1 and 2, thus turning the lamp 32 and bracket 34 to the same angular deflection. By means of the connecting rod 27, the lamp 32ª turning in unison with the lamp 32, said rod 27 being pivotally connected to the arms 3 and 3ª, as shown in Figs. 5, 6 and 7. Said Figs. 5, 6 and 7 are end and front elevations and plan respectively of this part of the device. The said connecting rod consists of two portions, 27 and 28, which are connected and adjustable by the turn-buckle 31. Slight modifications may be made in the construction of this rod to suit the construction of various automobiles, as for instance the rod may be constructed with a drop as shown by the dotted lines in Fig. 6, to avoid coming in contact with the engine starting crank of an automobile.

As shown in Figs. 3 and 4, which are two vertical sections of the head 1, said sections being perpendicular to each other, the rise of the spindle 18 that has the base end of its pocket conformably engaging in the concave seat at the upper end of the head 1 appears when the spindle is turned 90 degrees of a revolution, said rise being indicated at the dotted line *a*. This rise combined with the action of the spiral spring 35, which surrounds the lower portion of the spindle between the head 1, and the collar and nut 25, which exerts a downward pull on the bearing of the spindle, and will tend to make the spindle assume its normal position.

When the device is not in use, the spindle 18 may be disengaged from the steering gear and prevented from turning by the manipulation of the screw 16, as shown in Fig. 4. If desired, my invention may be utilized as shown by the modification represented in Figs. 9, 10 and 11, which are respectively a applied to, and working in combination with the tie-bar 35 of an automobile which connects the steering arms 36′ of the axles 33. In this modified form of construction, which does not depart from the scope and spirit of my invention 35 is the tie-bar which connects the two front wheels of the vehicle, 38 is a slotted plate which is suitably secured to the said tie-bar. The bent sleeve 37 and the bent arm 3 pass through the slotted plate 38 which controls the turning of the light and at the same time permits the plate 38 to rise and fall without affecting the position of the lamp when the wheels encounter a rough or uneven road.

The rectilinear motion of the tie-bar 35 and the plate 38 is converted to a rotary motion of the lamp or lamps by the means above described.

With this description of my invention, what I claim as new and desire to secure by Letters-Patent, is—

1. In combination with a bearing head, a spindle extending through said head and having an upper pocket to receive the lamp bracket the base end of which pocket seats on the upper end of the bearing head, a bent arm having one end extending into and secured to the lower end of said spindle, and means to connect the opposite end of said arm to the steering mechanism of an automobile or the like.

2. In combination with a bearing head having a concave seat at its upper end, a spindle in the bearing head having a cylindrical pocket at its upper end, the base end of said pocket being conformably received in said concave seat, a lamp bracket having the lower end thereof rotatably received in said pocket, a set screw to hold said lamp bracket against rotation in said pocket, and means to connect the spindle to the steering mechanism of an automobile or the like.

3. In combination with a bearing head, a spindle arranged therein, a cylindrical pocket carried by said spindle and engaging the upper end of said bearing head so as to hold the spindle against downward movement, a lamp bracket having a part thereof rotatably mounted in said pocket so as to enable the lamp to be turned in a horizontal plane independent of the spindle, and a set screw to lock the lamp bracket in the pocket against movement independent thereof.

4. In combination with a bearing head, a spindle arranged therein, a cylindrical pocket carried by said spindle and engaging the upper end of said bearing head so as to hold the spindle against downward movement, the upper end of said bearing head being inclined, a lamp bracket having a part thereof rotatably mounted in said pocket, an abutment on the spindle below the bearing head, a spring encircling the spindle and engaging between the lower end of said bearing head and the abutment to exert downward pressure thereon to assist the spindle in riding down said inclined portion of the upper end of the bearing head after the spindle has been given partial rotary movement, and means to connect the spindle to the steering mechanism of an automobile.

In testimony whereof I affix my signature in presence of two witnesses.

WILSON B. HARGREAVES.

Witnesses:
FREDERIC C. BARNES,
WM. M. DROSE.